Aug. 12, 1952  R. R. CANDOR  2,606,991
ELECTRIC APPLIANCE CONTROL
Filed May 11, 1946  5 Sheets-Sheet 1

FIG. 1

INVENTOR.
BY Robert R. Candor
Spencer Hardman & John
Attorneys

Aug. 12, 1952  R. R. CANDOR  2,606,991
ELECTRIC APPLIANCE CONTROL
Filed May 11, 1946  5 Sheets-Sheet 2

INVENTOR.
Robert R. Candor
BY
Spencer Hardman & Fehr
Attorneys

Aug. 12, 1952     R. R. CANDOR     2,606,991

ELECTRIC APPLIANCE CONTROL

Filed May 11, 1946     5 Sheets-Sheet 3

INVENTOR.
Robert R. Candor
BY
Spencer Hardman & John
Attorneys

FIG. 9

INVENTOR.
ROBERT R. CANDOR
BY
Attorneys

Aug. 12, 1952 R. R. CANDOR 2,606,991
ELECTRIC APPLIANCE CONTROL
Filed May 11, 1946 5 Sheets-Sheet 5

INVENTOR.
ROBERT R. CANDOR
BY
Attorney

Patented Aug. 12, 1952

2,606,991

UNITED STATES PATENT OFFICE 2,606,991

ELECTRIC APPLIANCE CONTROL

Robert R. Candor, Oakwood, Ohio, assignor to General Motors Corporation, Dayton, Ohio, a corporation of Delaware Application May 11, 1946, Serial No. 669,203

15 Claims. (Cl. 219—20)

This invention relates to domestic appliances, and more particularly to the time and thermostatic control of a range, or the like.

Heretofore it has been customary to provide the oven of a range with a timer and a thermostat, each having various adjustments necessary to be manipulated for the purpose of establishing a future predetermined cooking operation at a selected temperature. However, it is often desirable to operate the range oven without control by the timer, and it is therefore necessary to provide some selector mechanism which places the timer in control or out of control of the range oven. This selector generally requires a lever or knob to be moved from one position to another, in order to connect or disconnect the timer from the system. Since this selector knob is more or less independent of the thermostatic adjustment or the time adjustment, this knob is frequently forgotten in setting up the controls. Consequently, when the selector knob is left in the wrong position, the cooking operation is not performed as intended and the user thus defeats the very purpose of the controls.

An object of this invention is to provide a combined timer and thermostat of such a character that the user cannot overlook a selection of the use or non-use of the timer.

Another object of this invention is to provide a thermostat with a warning signal, which indicates whether the timer is in control or out of control of the thermostat.

Another object of this invention is to provide a timer which is capable not only of starting and stopping a future cooking operation but also is capable of controlling a thermostat, so that the user cannot overlook the fact that the timer is in or out of control of the cooking operation.

This application illustrates the invention as applied to a timer of the general character disclosed in the patent to Hutt 2,310,527, granted February 9, 1943; but it is to be understood that many of the principles of this invention are applicable to timers of other construction and mode of operation.

Further objects and advantages of the present invention will be apparent from the following description, reference being had to the accompanying drawings, wherein a preferred form of the present invention is clearly shown.

In the drawings, the reference numerals which are numbered below 200 are used to designate elements which are disclosed in the Hutt patent, above referred to, and it is to be understood that such elements are to operate, and be constructed, the same as disclosed in the Hutt patent, and that any disclosure in the Hutt patent not specifically described herein is intended to be added, by reference to said patent, to this application. For the sake of brevity, only certain figures of this application are taken from the Hutt patent, with modifications; but it is to be understood that the other figures of the Hutt patent are equally as pertinent. The reference characters above 200, as used in this application, are intended to designate the elements which are added by applicant to the structure of the Hutt patent in order to construct a preferred embodiment of the present invention.

According to this invention, a thermostat is placed, with the timer, in joint control of the heaters. The thermostat is so constructed that it is obscured, as by an iris diaphragm 205, whenever a combined timer and thermostatic cooking operation has been completed. Thereafter, when the user next desires to use the heaters, he is confronted with the obscured thermostat. Therefore he must operate the thermostat adjusting handle 201 first to the off position to open the iris diaphragm, so that he may observe the temperature indications. When he so moves the handle he automatically takes the timer out of control, and he may thereafter set the thermostat handle to any desired temperature and perform a non-timer cooking operation; or he may additionally set the timer start and stop indicators 33 and 34 (or stop indicator alone) and perform a timed thermostatic cooking operation. Thus he automatically selects a timer or non-timer operation.

As the start and stop indicators 33 and 34 are always locked to the hour hand 35 by pins 120 and 121 unless deliberately set by the user, he always knows whether a timed operation has been set or not. Also, since the thermostat is always obscured unless returned to the off position, he is required to so return the thermostat before he sets the thermostat. Thus he is required to take the timer out of control by such return movement, and then is required automatically to select timer or non-timer control merely by setting or not setting the start or stop indicators 33 and 34.

To this end, a thermostat 200, of any suitable or well known construction, is provided with a temperature adjusting means or handle 201, which is adjustable by rotation around the shaft 202 to set the thermostat at any desired cooking temperature. It may be provided with temperature indicating means 203 in the form of a dial 204 upon which are placed the characters "off," 100, 200, etc., to indicate the temperature or condition of heaters. For the purpose of illustration, the dial 204 is stationary; but may rotate with the handle 201, as is well known, adjacent a stationary indicator.

The thermostat 200 is provided with an iris diaphragm 205, or other suitable obscuring means, which is capable of obscuring the temperature markings at the termination of a time controlled cooking operation. This iris diaphragm may then be opened to show the temperature markings when the thermostat handle 201 is properly manipulated, by movement to the off position, for example, under which manipulation, the timer is taken out of control of the thermostat until such time as the user decides, deliberately, to set the timer indicators 33 and 34 for a future cooking operation.

The iris diaphragm 205 may be of any suitable construction, such as is used in an iris diaphragm in a camera shutter, and the same may be opened, as is well known, by the movement of lever 206. This lever 206 may be moved clockwise from the closed (dotted) position shown in Fig. 1, to the open (full line) position by impact of a pin 207 carried by the handle 201, as the handle 201 is moved back to the "off" position. The lever 206 is moved against the action of a spring, diagrammatically indicated at 208, until the lever 206 catches behind the latch 209 which is downwardly pushed by gravity or spring action. The lever 206 moves counterclockwise to the dotted position shown in Fig. 1 whenever the latch 209 is raised by the energization of solenoid 210. When the lever 206 is moved clockwise behind the latch 209, it pushes the movable switch contact 211 against the stationary contacts 212, by impact upon the rod 213. The rod 213 normally is sprung open away from the position shown in Fig. 1 by compression spring 214 placed between the abutment 215 and the washer 216 fixed on the rod 213.

Figure 1:
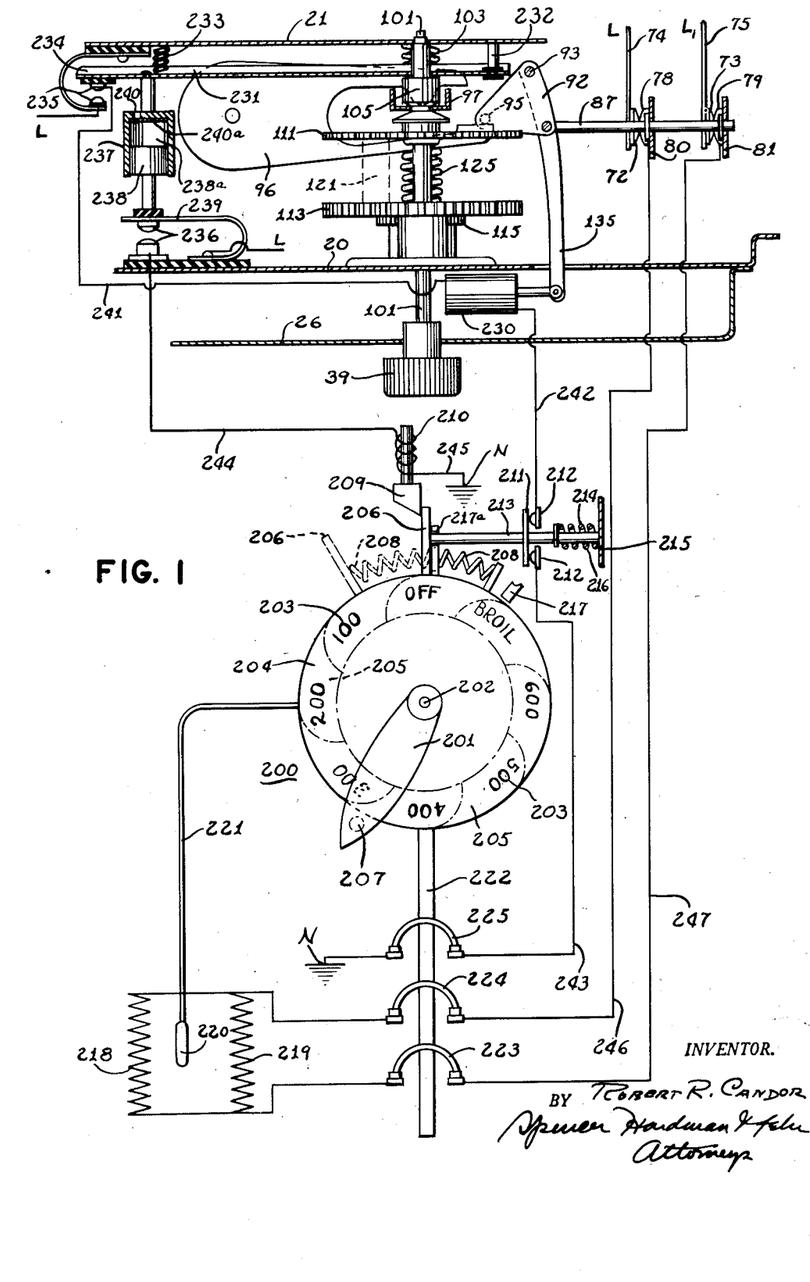
Fig. 1 is a diagrammatic representation, generally in cross-section, taken approximately along line 1—1 of Figs. 2 and 3, and showing the elements which are applied to a known construction of timer, such as that disclosed in the Hutt patent.

A stop 217 is provided for the upper limit to which the handle 201 may be moved counterclockwise in the adjustment of the thermostat. The stop 217a forms the clockwise limit of the handle 201. The pin 207 strikes against the stops 217 and 217a when the handle has been moved to its extreme position. It is to be understood that the thermostat 200 may, in addition to temperature control, modify the energization of the heaters 218 and 219, so that one of the heaters alone may be energized in the broil position, in a manner not illustrated, since it is well known and is accomplished by additional switch construction between the heaters 218, 219 and the thermostat switches 224, 225. The heaters 218 and 219 may be the upper and lower heaters of an oven, which is provided with the thermostatic liquid-containing bulb 220, connected by the tube 221 with a suitable diaphragm, not shown, which moves the rod 222 to open and close contacts 223, 224 and 225 in response to oven temperatures. This opening and closing operation occurs at a temperature corresponding to that selected by the position of handle 201. Merely by way of example, the thermostat may be of the character disclosed in the patent to Weber 2,385,433, granted September 25, 1945. In the Weber patent, its dial 100 rotates with its knob 8; but an iris diaphragm may be placed in front of the rotatable dial equally as well as over a stationary dial, and the operation of the invention otherwise remains the same. Another patent showing a thermostat which may be used is the patent to Weber 2,385,434, granted September 25, 1945.

Figure 2:
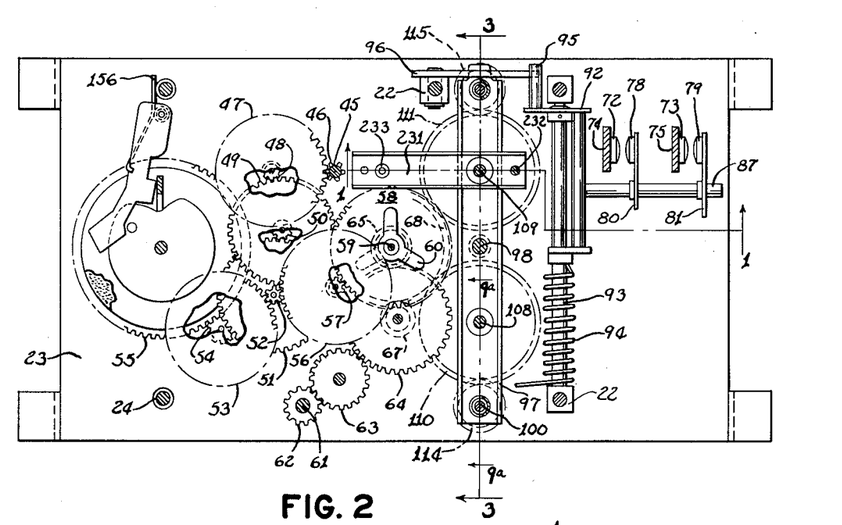
Fig. 2 is a view similar to Fig. 3, inverted, of the Hutt patent, showing the position where the added elements are incorporated.
Figure 3:
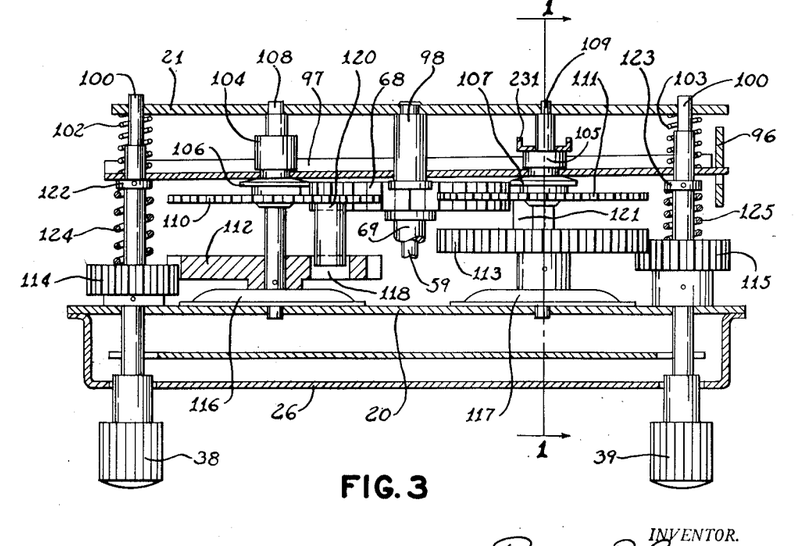
Fig. 3 is a view similar to Fig. 8, inverted, of the Hutt patent, showing where some of the elements of this invention are incorporated.
Figure 10:
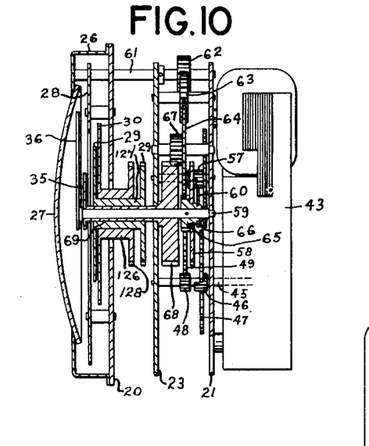
Fig. 10 is a section taken along the line 10—10 of Fig. 11.
Figure 11:
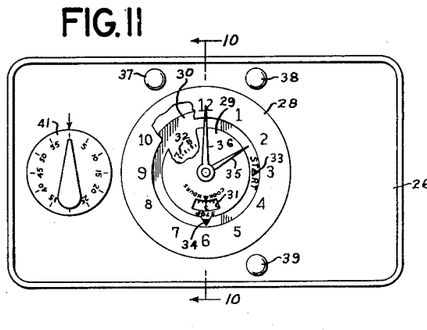
Fig. 11 is a front elevation of a preferred embodiment of the timer part of my invention, certain parts being broken away.
Figure 12:
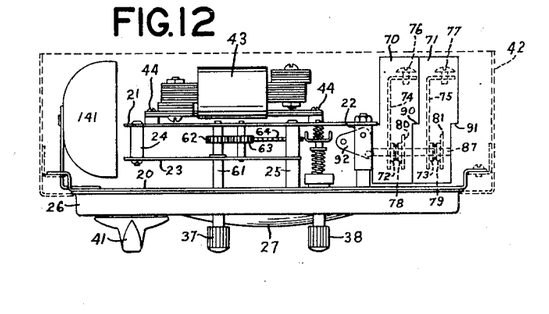
Fig. 12 is a plan view showing the general organization of the timer shown in Fig. 11, certain parts being omitted for purpose of clarity.

When the user (see particularly my Fig. 3) at two o'clock, for example, wishes to set the time for a future cooking operation, he pushes the start knob 38 inwardly to remove pin 120 from gear 112 and turns knob 38 until the start indicator 33 is placed at a selected starting time, such as three o'clock by means of gears 114, 112, which meshes with gear 128 (Fig. 10) and sleeve 126 and start dial 30 which carries start indicator 33. He then releases the knob 38, which moves out and allows pin 120 to engage the surface of gear 112. He then pushes in the stop knob 39 and rotates it to set the stop indicator 34 at the selected stopping time, such as six o'clock by means of gears 115 and 113 which meshes with (Fig. 10) gear 129, the sleeve 127 and the stop dial 29 which carries stop indicator 34. When these operations are performed by the user, the bar 97 is moved, as described in the Hutt patent, so that the timer controlled switches 78 and 79 (my Fig. 2) are moved to open position from two o'clock to three o'clock. At three o'clock the switches 78 and 79 are closed, by movement of the bar 97, when the pin 120 enters the opening 118 (my Fig. 3). The bar 97 moves lever 86 (my Figs. 2 and 3) which in turn moves actuating member 82 and rod 81. Thereafter the contacts 78 and 79 remain closed until six o'clock when they are opened by the further movement of bar 97 when the pin 121 enters the openings 119 (my Fig. 3). This opening and closing of the contacts 78 and 79 is accomplished by the movement of a lever 96 against the pin 95, which is secured to and rocks the actuating member 92. These members are spring biased as disclosed in the Hutt patent, and if desired, this bias can be counteracted by the movement of lever 135. The lever 135 may be moved to the closed position and held there, under which conditions the contacts 78 and 79 (shown in my Fig. 1) remain closed regardless of the timer impulse produced by the lever 96.

The start and stop indicators 33 and 34 are moved out of coincidence with the time or hour hand 35 by manipulation of the start and stop knobs 38 and 39. As the hour hand 35 moves into coincidence with the start and stop indicators 33 and 34, the indicators are picked up or carried in coincidence with the hour hand until the knobs 38 and 39 are again manipulated. This is well known and is disclosed in the Hutt patent.

The lever 135, which corresponds to 135 of Hutt, is provided with a solenoid 230 (my Fig. 1) which, when energized, takes the timer out of control. It does this by moving the lever 135 to the left of closed switch position, and maintains the contacts 78 and 79 closed regardless of whether the timer attempts to open them by downward movement of lever 96, shown in my Fig. 1. Whenever the solenoid 230 is energized, it maintains the lever 135 and rod 87 in the position shown in my Fig. 1, regardless of the fact that lever 96 might be moved downwardly by the timer. Proper controls are provided for the solenoid 230, to energize it at the required time, as hereinafter more fully described.

Figure 13:
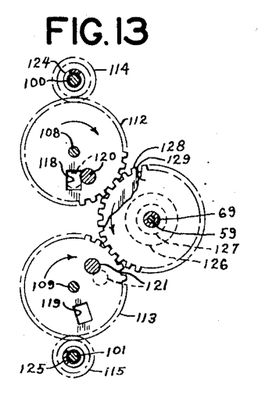
Fig. 13 is a section of certain parts shown at right angles to Fig. 3.

The hub 105 (my Fig. 3) moves when the hour hand 35 moves into coincidence with the stop indicator 34, because at this time the pin 121 enters the opening 119 (my Fig. 13). According to this invention, a spring-pressed lever 231 (my Fig. 1) moves at the same time. The lever 231 is pivoted at the pin 232 and is spring-pressed towards the hub 105 by the spring 233. Whenever the hub 105 moves toward the plate 20, the end 234 of the rod 231 moves likewise to close the contacts 235 and temporarily to close the contacts 236. The contacts 236 are temporarily closed by the action of the time delay dash-pot 237, which is provided with a piston 238 which is moved down by air pressure temporarily to close the contacts 236, after which the piston slowly moves upward to open the contacts 236 under upward spring pressure of the spring conductor 239, due to the slow leakage of air through the opening 240. If desired, a check valve 240a is provided which allows a relatively fast entrance of air into the chamber 238a; but restricts the outward flow of air through a small opening in the check valve adjacent the opening 240. One of the contacts of switch 235 is connected to the power line L, while the other is connected by the conductor 241 with the timer solenoid 230. The other terminal of the solenoid 230 is connected by the conductor 242 with one of the contacts 212, the other contact 212 being connected by the conductor 243 with the switch 225 and thence to another power line such as the neutral N. Thus, whenever the switches 235, 212 and 225 are closed simultaneously, the solenoid 230 is energized and the timer switches 78 and 79 are closed, regardless of the timer impulse placed on the lever 96.

One of the contacts of switch 236 is connected to the power line L by the spring conductor 239.

The other contact of switch 236 is connected by conductor 244 with the latch solenoid 210, the other terminal of which is connected by the conductor 245 with another power line, such as the neutral N. Whenever the switch 236 is temporarily closed, the latch 209 is temporarily raised to release the lever 206, thus to close the iris diaphragm 205.

The stationary contacts 72 and 73 are connected by strips 74 and 75 respectively, with the power lines L, L₁. If the contacts 78 and 79 are closed, the lines L and L₁ are connected by conductors 246 and 247, respectively, with the switches 224 and 223, which are connected to heaters 218 and 219 to energize the same whenever these switches are simultaneously closed.

Figure 4:
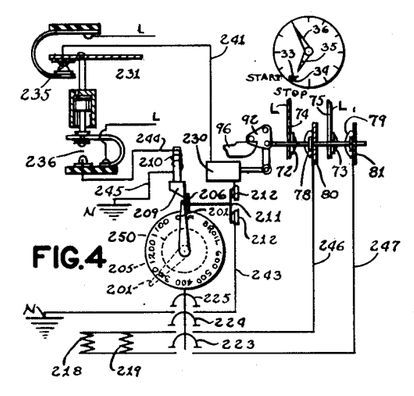
Fig. 4 is a diagrammatic representation of the position of various elements of Fig. 1 at a time when the user elects to perform a cooking operation under thermostatic control, without time control.
Figure 5:
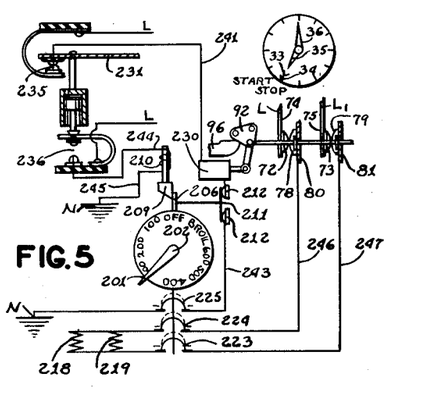
Fig. 5 is a view similar to Fig. 4, but showing the position of the elements after the user has completed all of the adjustments necessary to cook under thermostatic control, without time control.

In the operation of this invention, referring particularly to Figs. 4 and 5, for the purpose of illustration only, let it be assumed that the user, at any time prior to 7:00 o'clock, such as at 6:55 o'clock, decides that he wishes to perform a thermostat controlled operation without the timer. If the previous operation was timer controlled, the thermostat handle 201 would be in the dotted position shown in Fig. 4. The iris diaphragm would be in the closed position shown by the dotted circle 250. This would obscure the temperature dial and indicate to the user that, in order to perform a cooking operation, it is necessary for him first to move handle 201 to the "off" position. When he does this, as shown in the full position of handle 201 in Fig. 4, he automatically latches the lever 206 behind the latch 209, thus opening the iris diaphragm 205, closing the switch 211, 212, and opening the thermostat switches 225, 224 and 223. Since, by the operation described in the Hutt patent, when the hour hand 35 and start and stop indicators 33 and 34 are in coincidence, the hub 105 is in its down position. Consequently the contacts 235 are closed; but the contacts 236 are now open, although previously they had been temporarily closed. Therefore, at any time prior to 7:00 o'clock, such as at 6:55, the contacts 78 and 79 are open because the solenoid 230 is not energized since the switch 225 is open whenever the thermostat is adjusted to the "off" position, as disclosed in Weber patents. A few moments later, such as 7:00 o'clock, the user moves the handle 201 to the position shown in Fig. 5, and the contacts 225 close, thus establishing a circuit through the solenoid 230 and thus in turn, taking the timer out of control and closing the contacts 78 and 79. The heaters 218 and 219 can then be cycled by the thermostat to maintain the oven at the temperature selected by the position of the handle 201 independently of the timer as long as the user elects to permit such an operation. It is to be understood, by reference to the Hutt patent, that the start and stop indicators 35 and 34 will follow the time indicator or hour hand 35 indefinitely until such time as the operator actuates the knobs 38 and 39. Therefore the cooking operation started as shown in Fig. 5 will continue without timer control until the user either moves the handle 201 to the "off" position to stop the cooking operation or actuates the knobs 38 and 39 to move the indicators 33 and 34 away from coincidence with the time or hour hand 35 to start a timer controlled cooking operation. While 6:55 and 7:00 o'clock have been given by way of example, this is to be understood to be illustrative only, and that the invention may be used at any other times, and that the five minute interval may be only a few moments.

Figure 6:
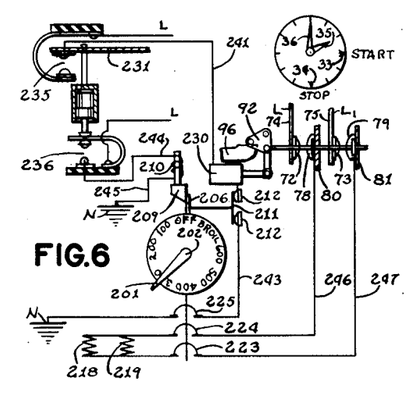
Fig. 6 is a view showing the position of the various elements at a time, such as two o'clock, when the user elects to perform a cooking operation at a future time under the combined control of the timer and thermostat.
Figure 7:
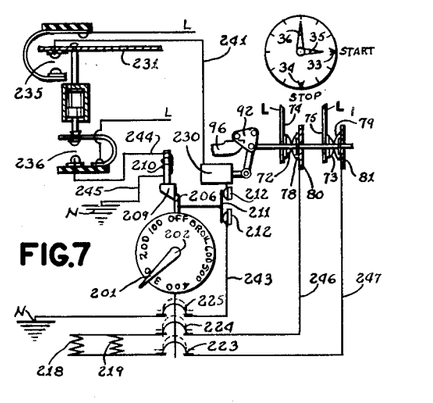
Fig. 7 is a view similar to Fig. 6; but showing the position of the elements when the cooking operation starts, such as three o'clock, under the combined control of the timer and thermostat.
Figure 8:
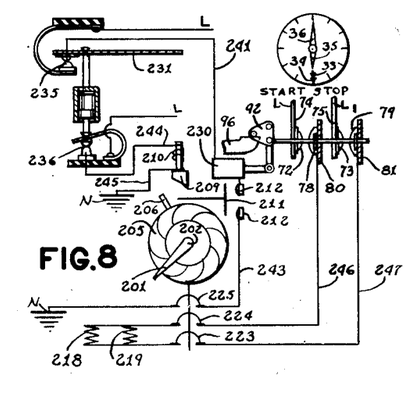
Fig. 8 shows the position of the elements at the termination of the cooking operation, such as at six o'clock, which was started as shown in Fig. 7.

Referring now to Figs. 6, 7 and 8 and assuming that the user wishes to perform a timer controlled cooking operation at some future time, again for the purpose of illustration only, let it be assumed that at two o'clock he decides to have the cooking operation start at three o'clock and terminate at six o'clock, and that the temperature of the cooking operation shall be 300°. He actuates the knobs 38 and 39 to set the start and stop indicators 33 and 34 at three and six respectively, and moves the handle 201 to 300°, if not already there, all as shown in Fig. 6. The solenoid 230 is deenergized by movement of the bar 231 to open contacts 235 when the start knob 39 is actuated inward. This opens the contacts 78 and 79 by operation of lever 96 precisely as described in the Hutt patent without interference from the solenoid 230. If the iris diaphragm was closed, then the handle 201 first would be moved to the "off" position to latch the lever 206 and then back to 300, which operation is presumed to have been performed, if desired, by the user. At three o'clock, Fig. 7, the hub 104 of Hutt moves lever 96 to close the contacts 78 and 79. Under these conditions the heaters 218 and 219 are cycled by operation of the thermostat to maintain a 300° temperature in the oven until six o'clock. At six o'clock, Fig. 8, the hub 105, of Hutt, moves to open the contacts 78 and 79 by operation of lever 96. Simultaneously, the contacts 236 are closed temporarily by downward movement of bar 231 to energize solenoid 210 and raise latch 209. This releases the lever 206 to close the diaphragm 205 and open the switch 211, 212. The opening of the switch 211 and 212 maintains the solenoid 230 deenergized and permits the timer to open the contacts 78 and 79 as described in Hutt, thus terminating the timer controlled cooking operation. The heaters 218 and 219 will now remain deenergized until such time as the user elects either to move the handle 201 to the "off" position and then back to a cooking position, as previously described with respect to Figs. 4 and 5, or to move the handle 201 back to the "off" position and then to a temperature position, together with setting of the timer indicators, as described with respect to Figs. 6, 7 and 8.

Thus it is to be seen that the user does not have to set any selector lever, corresponding to 40 of Hutt; but he selects between timer control and non-timer control merely by the proper operation of the handles 201, 38 and 39, and he is properly warned as to the condition of the circuits by the position of the iris diaphragm 205, and the relative positions of the indicators 33 and 34 and the hour hand 35. The selector knob 40, of Hutt, is eliminated by this invention.

In the foregoing description of Figs. 1 through 8 inclusive, it is assumed that the user never will move the start indicator 33 away from the hour hand 35 unless he also at the same time moves the stop indicator 34 away from the hour hand 35.

Figure 9:
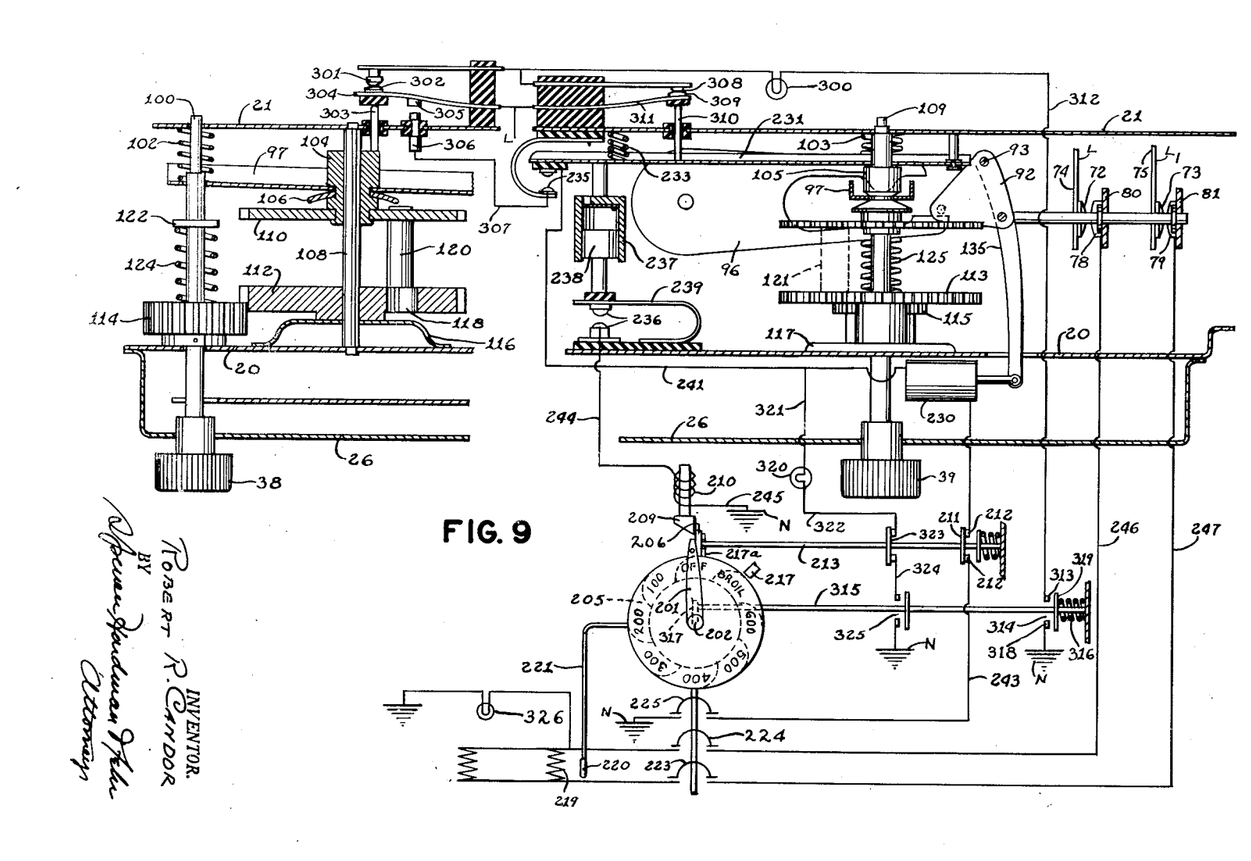
Fig. 9 is a diagrammatic representation, similar to Fig. 1, showing a modified form, with the right hand portion taken along a plane similar to Fig. 1 and the left hand portion taken along a plane at right angles thereto and substantially along line 9a—9a of Fig. 2.

Referring now to Fig. 9, a modification is shown therein where actuation of the start indicator 33 away from the hour hand 35, without setting stop indicator 34, will start a cooking operation at the time indicated by the start indicator, which cooking operation will continue indefinitely until the user returns the handle 201 to the off position. In addition, Fig. 9 shows a combined timer and thermostat indicating light 300, which is illuminated whenever the thermostat is moved from the off position, and either the start indicator 33 or the stop indicator 34 is moved out of coincidence from the hour hand 35. This figure also shows a thermostat and non-timer indicating light 320, which is illuminated whenever the thermostat handle 201 is moved away from the off position without setting the start and stop indicators 33 and 34 away from the hour hand 35. This figure also shows a cycling light 326 which is illuminated whenever the heaters 218 and/or 219 are energized whether under the control of the thermostat alone, or in combination with the timer.

In Fig. 9, the right hand portion is substantially the same as Fig. 1, except that parts have been added to perform the additional functions above described. The left hand portion of Fig. 9 is taken along the line 9a—9a of Fig. 2, and shows the additional elements for performing the additional functions heretofore described. Whenever numerals are used in Fig. 9 which correspond to numerals heretofore used with respect to Figs. 1 through 8, or which correspond to numerals used in the Hutt patent, it is to be understood that the operation of such parts is the same as heretofore described with respect to Figs. 1 through 8 or with respect to the Hutt patent, except as necessarily modified to accomplish the additional functions of Fig. 9.

To provide controls for a combined timer and thermostat indicating light 300, contacts 301 and 302 are provided, which are closed whenever the start indicator 33 is moved out of coincidence from the hour hand 35, by operation of the knob 38. Operation of the knob 38 upward moves the bar 97 and hub 104 upwardly (in Fig. 9) to move the pin 303 against the insulation button of the spring conductor 304 to close the contacts 301 and 302 as long as the start indicator 33 is out of coincidence with the hour hand 35. In addition the spring conductor 304 is provided with a contact 305 which closes upon contact 306 whenever the start indicator 33 moves into coincidence with the hour hand 35. Thus a circuit is established from the line L through the contacts 301, 302 to the lamp 300 whenever the start indicator 33 is out of coincidence with the hour hand 35; and whenever this light circuit is broken, a solenoid circuit is established, which passes through the contacts 305, 306, through the conductor 307 to the contacts 235 (closed whenever the stop indicator 34 is in coincidence with the hour hand 35) to establish a circuit to the solenoid 230, through the line 241 whenever both the start and stop indicators 33 and 34 are in coincidence with the hour hand 35.

Another parallel circuit is established to the light 300 through the contacts 308 and 309 whenever the stop indicator 34 is moved out of coincidence with the hour hand 35. This is accomplished by upward movement of the pin 310 by bar 231 to close the contacts 308 and 309 against the spring action of conductor 311. Thus this last circuit is established from the line L to the light 300 whenever the stop indicator 34 is moved out of coincidence with the hour hand 35.

The other terminal of the light 300 is connected by the conductor 312 with the stationary contact 313 of a switch 314 which is closed whenever the thermostat handle 201 is moved away from the off position. The movable contact 319 of switch 314 is carried on a rod 315 which is urged to the left by the spring 316 against the lever 317 carried by the shaft 202 of the handle 201. The other stationary contact 318 is connected to a power line such as the neutral N. Thus, whenever the thermostat handle 201 is moved from the off position, and either or both the start and stop indicators 33 and 34 are moved out of coincidence with the hour hand 35, the combined timer and thermostat indicating light 300 is illuminated. Its illumination thus indicates that the over heaters are under the combined control of both the timer and thermostat; and its non-illumination indicates that the timer is out of control of the circuit, and that the thermostat may or may not be adjusted from the off position.

The circuit for solenoid 230, in Fig. 9, makes it necessary for both the start and stop indicators 33 and 34 to be in coincidence with the hour hand 35, and for the thermostat to be moved first to the off position and then to a temperature setting before the timer is taken out of control by the solenoid 230. Thus the solenoid 230 is energized only when the following switches are closed: switch 305, 306 (start and hour indicators in coincidence); switch 235 (stop and hour indicators in coincidence); switch 211, 212 (thermostat first set to off position to latch lever 206); switch 225 (closed when thermostat is moved to temperature setting). Therefore, whenever the user allows the start and stop indicators to remain in coincidence with the hour hand (normal condition), moves the thermostat to off position (if not already there) and then moves thermostat to a temperature setting, he establishes a thermostatic cooking operation without timer control.

A thermostat and non-timer indicating light 320 is illuminated under the conditions of the preceding paragraph. It is connected to the conductor 241 by connector 321. Its other terminal is connected by conductor 322 with the switch 323 added to the rod 213. The switch 323 is opened whenever the lever 206 has been released by the latch 209. The switch 323 is connected by conductor 324 with another switch 325 and from thence to a power line such as the neutral N. The switch 325 is carried by the rod 315, and is opened whenever the thermostat is in the off position, and is closed whenever the thermostat is in a temperature position. Thus the light 320 is illuminated whenever the thermostat 201 is set to a temperature position, following an initial movement of the handle 201 to the off position without setting the timer. As long as the timer has not been set, the contacts 305, 306, 235, 323 and 325 are all closed, and illumination of the light 320 is a signal that the thermostat has been set without timer control. However, should either of the start or stop indicators 33 or 34 be moved out of coincidence with the hour hand 35, then the circuit to the light 320 would be broken by the opening of contacts 305, 306, or the contacts 235, and thus the light 320 would not be illuminated, and, at the same time the solenoid 230 would be deenergized by the breaking of its circuit at either of the switches 305, 306, or 235, and the timer would be placed in control.

A cycling light 326 is placed between one of the conductors to the heaters 218 and 219 and the neutral N, so that it is illuminated whenever either or both of these heaters are energized regardless of whether the thermostat is used alone or is combined with the timer control. Thus the light 326 cycles to indicate that the heaters are energized, and darkens to indicate that the heaters are deenergized.

Since the lights 300, 320 and 326 may illuminate, or shine through suitable legends to inform the user as to the condition of the controls, the diaphragm 205 may be used or omitted, and, if omitted, reliance may be placed on the proper illumination of the legends to insure that the controls are properly manipulated. If the diaphragm is omitted, the lever 206 is retained, with its spring, and holds rod 213 when latched.

In operation of the modification shown in Fig. 9, let it be assumed that at two o'clock, the user wishes to establish a future thermostat controlled cooking operation at 300° for example, which starts at three o'clock and continues indefinitely until the thermostat is turned off. The user sets the start indicator 33 at three o'clock and moves the thermostat handle from the off position to 300°. The light 300 is immediately illuminated at two o'clock and darkens at three o'clock; but the contacts 78, 79 remain open until three o'clock when they close indefinitely because of the energization of solenoid 230. At three o'clock the light 320 would be illuminated to indicate that the cooking operation will continue under control of the thermostat without further timer control. The circuit for lamp 300 at two o'clock would be L, 304, 302, 301, 300, 312, 314, N. At three o'clock this circuit is opened at 301, 302, when coincidence of the start and hour indicators lowers hub 104. The circuit for solenoid 230 is open at two o'clock, at the open switch 305, 306; but is closed at three o'clock as follows: L, 305, 306, 307, 235, 241, 230, 212, 211, 243, 225, N, thus taking the timer out of control every time the thermostat closes, and thus cycling the heaters 218 and 219 indefinitely. Light 320 which was dark from two to three o'clock because of open switch 305, 306, illuminates at three o'clock, the circuit being L, 305, 306, 307, 235, 241, 321, 320, 323, 324, 325, N.

Next, with regard to Fig. 9, let it be assumed that the user desires, at two o'clock, to have a timer-thermostat cooking operation at 300° starting at three and ending at six o'clock. He sets the indicators 33 and 34 at three and six o'clock respectively, turns thermostat handle 201 to off (if not already there) and then to 300°. The light 300 illuminated at two o'clock darkens at six o'clock. Switches 78, 79 remain open from two to three, close from three to six and open at six and remain open indefinitely until the thermostat is returned to off. The light 320 never illuminates, and light 326 cycles with the heaters, which cycle from three to six to maintain the oven at 300°. The closed circuit for light 300 is the same as in the preceding paragraph from two to three with a parallel circuit from L through 311, 309, 308, 300 etc. At three the circuit is opened at 301, 302; but remains closed through parallel switch 308, 309. At six o'clock, this circuit is opened at the switch 308, 309 to darken light 300. The circuit for light 320 is open at 305, 306 and 235 from two to three, remains open at 235 from three to six, and is opened at 323 at six, when the latch 209 releases lever 206 and thus opening switch 323. Thus light 320 is not illuminated under these conditions. The circuit for solenoid 230 is open at 305 and 235 from two to three, remains open from three to six at 235, and opens at 211, 212 at six o'clock, remaining open indefinitely until the thermostat is returned to "off", when it is opened indefinitely at 225 until the thermostat is again set for a temperature setting. Thus the timer is in control of the heater circuit from two o'clock until six and remains in control to keep contacts 78 and 79 open indefinitely until the thermostat is returned to "off."

Next assume that, at two o'clock, the user desires to have a thermostat, non-timer, cooking operation at 300°. He leaves the start and stop indicators 33 and 34 in coincidence with the hour hand 35 (as they normally are), moves the thermostat handle 201 to off (if not already there) and then to 300°. The heaters 218 and 219 are then cycled indefinitely through switches 78, 79, 224 and 223, without timer control, to maintain the oven at 300°. The light 320 is illuminated indefinitely and light 326 is cycled, with the heaters, until the user terminates the operation by returning the thermostat to off. The circuit to the heaters is established by the energization of solenoid 230, which is energized every time the thermostat closes (when cold). The closed circuit for solenoid 230 is from L through closed switches 305, 235, 211, 225 and N. The closed circuit for light 320 is from L through closed switches 305, 235, 323, 325 and N and remains closed until the thermostat is returned to off.

While the form of embodiment of the invention as herein disclosed, constitutes a preferred form, it is to be understood that other forms might be adopted, as may come within the scope of the claims which follow.

What is claimed is as follows:

1. In combination, heating means, a thermostat responsive to temperatures produced by said heating means, temperature adjusting means for setting said thermostat and having off and temperature settings, temperature indicating means to indicate said settings, a timer having time and stop indicators, setting means to set said timer to govern a predetermined period of time, energy conducting means for said heating means, energy flow control means for said energy conducting means under joint control of said thermostat and timer, obscuring means to obscure said temperature indicating means, and means rendering said obscuring means effective after said temperature adjusting means has been set to a temperature setting and said setting means has been set to govern a predetermined period of time and said predetermined period of time has terminated.

2. In combination, heating means, a thermostat responsive to temperatures produced by said heating means, temperature adjusting means for setting said thermostat and having off and temperature settings, temperature indicating means to indicate said settings, a timer having time and stop indicators, time setting means for setting said stop indicator out of coincidence with said time indicator, means for locking said stop indicator to said time indicator as said time indicator moves into coincidence with said stop indicator, energy flow control means for said heating means under joint control of said thermostat and timer, obscuring means to obscure said temperature indicating means, and means to render said obscuring means effective when said time indicator moves into coincidence with said stop indicator and said temperature adjusting means is at a temperature setting.

3. In combination, heating means, a thermostat responsive to temperatures produced by said heating means, temperature adjusting means for setting said thermostat and having off and temperature settings, temperature indicating means to indicate said settings, a timer having time and stop indicators, time setting means for setting said stop indicator out of coincidence with said time indicator, means for locking said stop indicator to said time indicator as said time indicator moves into coincidence with said stop indicator, energy flow control means for said heating means under joint control of said thermostat and timer, obscuring means to obscure said temperature indicating means, means to render said obscuring means effective when said time indicator moves into coincidence with said stop indicator and said temperature adjusting means is at a temperature setting, and means to render said obscuring means ineffective when said temperature adjusting means is moved to the off setting.

4. In combination, heating means, a thermostat responsive to temperatures produced by said heating means, temperature adjusting means for setting said thermostat and having off and temperature settings, temperature indicating means to indicate said settings, a timer having time, start, and stop indicators, time setting means for setting said start and stop indicators out of coincidence with said time indicator, means for locking said start and stop indicators to said time indicator as said time indicator moves into coincidence respectively with said start and stop indicators, a timer energy flow controller and a thermostat energy flow controller jointly controlling the flow of energy to said heating means, said timer energy flow controller stopping the flow of energy when said start indicator is out of coincidence with said time indicator or when said stop indicator is in coincidence with said time indicator, said thermostat flow controller stopping the flow of energy when said temperature adjusting means is in the off setting or when said temperature adjusting means is at a temperature setting and the space to be heated has reached the temperature of the setting, obscuring means to obscure said temperature indicating means, and means to render said obscuring means effective after said start and stop indicators have been moved out of coincidence with said time indicator and said temperature adjusting means has been set at a temperature setting and said time indicator has moved into coincidence with said start and stop indicators.

5. In combination, heating means, a thermostat responsive to temperature produced by said heating means, temperature adjusting means for setting said thermostat and having off and temperature settings, temperature indicating means to indicate said settings, a timer having time, start, and stop indicators, time setting means for setting said start and stop indicators out of coincidence with said time indicator, means for locking said start and stop indicators to said time indicator as said time indicator moves into coincidence respectively with said start and stop indicators, a timer energy flow controller and a thermostat energy flow controller jointly controlling the flow of energy to said heating means, said timer energy flow controller stopping the flow of energy when said start indicator is out of coincidence with said time indicator or when said stop indicator is in coincidence with said time indicator, said thermostat flow controller stopping the flow of energy when said temperature adjusting means is in the off setting or when said temperature adjusting means is at a temperature setting and the space to be heated has reached the temperature of the setting, obscuring means to obscure said temperature indicating means, means to render said obscuring means effective after said start and stop indicators have been moved out of coincidence with said time indicator and said temperature adjusting means has been set at a temperature setting and said time indicator has moved into coincidence with said start and stop indicators, and means to render said obscuring means ineffective by returning said temperature adjusting means to the off setting.

6. In combination, heating means, a thermostat responsive to temperatures produced by said heating means, temperature adjusting means for setting said thermostat and having off and temperature settings, temperature indicating means to indicate said settings, a timer having time, start, and stop indicators, time setting means for setting said start and stop indicators out of coincidence with said time indicator, means for locking said start and stop indicators to said time indicator as said time indicator moves into coincidence respectively with said start and stop indicators, a timer switch and a thermostat switch jointly controlling the energization of said heating means, said timer switch opening when said start indicator is out of coincidence with said time indicator or when said stop indicator is in coincidence with said time indicator, said thermostat switch being open when said temperature adjusting means is in the off setting or when said temperature adjusting means is at a temperature setting and the space to be heated has reached the temperature of the setting, obscuring means to obscure said temperature indicating means, means to render said obscuring means effective after said start and stop indicators have been moved out of coincidence with said time indicator and said temperature adjusting means has been set at a temperature setting and said time indicator has moved into coincidence with said start and stop indicators.

7. In combination, heating means, a thermostat responsive to temperatures produced by said heating means, temperature adjusting means for setting said thermostat and having off and temperature settings, temperature indicating means to indicate said settings, a timer having time, start, and stop indicators, time setting means for setting said start and stop indicators out of coincidence with said time indicator, means for locking said start and stop indicators to said time indicator as said time indicator moves into coincidence respectively with said start and stop indicators, a timer switch and a thermostat switch jointly controlling the energization of said heating means, said timer switch opening when said start indicator is out of coincidence with said time indicator or when said stop indicator is in coincidence with said time indicator, said thermostat switch being open when said temperature adjusting means is in the off setting or when said temperature adjusting means is at a temperature setting and the space to be heated has reached the temperature of the setting, obscuring means to obscure said temperature indicating means, means to render said obscuring means effective after said start and stop indicators have been moved out of coincidence with said time indicator and said temperature adjusting means has been set at a temperature setting and said time indicator has moved into coincidence with said start and stop indicators, and means to render said obscuring means ineffective by returning said temperature adjusting means to the off setting.

8. In combination, heating means, a thermostat responsive to temperatures produced by said heating means, temperature adjusting means for setting said thermostat and having off and temperature settings, temperature indicating means to indicate said settings, a timer having time and stop indicators, time setting means for setting said stop indicator out of coincidence with said time indicator, means for locking said stop indicator to said time indicator as said time indcator moves into coincidence with said stop indicator, energy flow control means for said heating means under joint control of said thermostat and timer, said timer placing said flow control means under the sole control of said thermostat when said off indicator is moved out of coincidence with said time indicator and stopping the flow of energy to said heating means when said indicators come into coincidence and said temperature adjusting means is at a temperature setting, and means responsive to the manual movement of said temperature adjusting means first to off setting and then to a temperature setting while said indicators coincide for taking said timer out of control of said flow control means.

9. In combination, heating means, a thermostat responsive to temperatures produced by said heating means, temperature adjusting means for setting said thermostat and having off and temperature settings, temperature indicating means to indicate said settings, a timer having time, start, and stop indicators, time setting means for setting said start and stop indicators out of coincidence with said time indicator, means for locking said start and stop indicators to said time indicator as said time indicator moves into coincidence respectively with said start and stop indicators, a timer energy flow controller and a thermostat energy flow controller jointly controlling the flow of energy to said heating means, said timer energy flow controller stopping the flow of energy when said start indicator is out of coincidence with said time indicator or when said stop indicator is in coincidence with said time indicator, said thermostat flow controller stopping the flow of energy when said temperature adjusting means is in the off setting or when said temperature adjusting means is at a temperature setting and the space to be heated has reached the temperature of the setting, and means responsive to the manual movement of said temperature adjusting means to off setting after said indicators have been moved out of coincidence and have returned into coincidence while said temperature adjusting means had been at a temperature setting for rendering said timer ineffective to control said heating means.

10. In combination, heating means, a thermostat responsive to temperatures produced by said heating means, temperature adjusting means for setting said thermostat and having off and temperature settings, temperature indicating means to indicate said settings, a timer having time, start, and stop indicators, time setting means for setting said start and stop indicators out of coincidence with said time indicator, means for locking said start and stop indicators to said time indicator as said time indicator moves into coincidence respectively with said start and stop indicators, a timer switch and a thermostat switch jointly controlling the energization of said heating means, said timer switch opening when said start indicator is out of coincidence with said time indicator or when said stop indicator is in coincidence with said time indicator, said thermostat switch being open when said temperature adjusting means is in the off setting or when said temperature adjusting means is at a temperature setting and the space to be heated has reached the temperature of the setting, and means responsive to manual movement of said temperature adjusting means to off setting after said indicators have been moved out of coincidence and have returned into coincidence while said temperature adjusting means had been at a temperature setting for rendering said timer ineffective to control said heating means.

11. In combination, heating means, a thermostat responsive to temperatures produced by said heating means, temperature adjusting means for setting said thermostat and having off and temperature settings, temperature indicating means to indicate said settings, a timer having time, start, and stop indicators, time setting means for setting said start and stop indicators out of coincidence with said time indicator, means for locking said start and stop indicators to said time indicator as said time indicator moves into coincidence respectively with said start and stop indicators, a timer energy flow controller and thermostat energy flow controller jointly controlling the flow of energy to said heating means, said timer energy flow controller stopping the flow of energy when said start indicator is out of coincidence with said time indicator or when said stop indicator is in coincidence with said time indicator, said thermostat flow controller stopping the flow of energy when said temperature adjusting means is in the off setting or when said temperature adjusting means is at a temperature setting and the space to be heated has reached the temperature of the setting, and solenoid means for taking said timer out of control of said timer energy flow controller, said solenoid means being energizable by moving said temperature adjusting means to its off setting and then to a temperature setting after said time indicator has moved into coincidence with said stop indicator.

12. In combination, heating means, a thermostat responsive to temperatures produced by said heating means, temperature adjusting means for setting said thermostat and having off and temperature settings, temperature indicating means to indicate said settings, a timer having time and stop indicators, time setting means for setting said stop indicator out of coincidence with said time indicator, means for locking said stop indicator to said time indicator as said time indicator moves into coincidence with said stop indicator, energy flow control means for said heating means under joint control of said thermostat and timer, and solenoid means for taking said timer out of control of said timer energy flow controller, said solenoid means being energizable by moving said temperature adjusting means to its off setting and then to a temperature setting after said time indicator has moved into coincidence with said stop indicator.

13. In combination, heating means, a thermostat responsive to temperatures produced by said heating means, temperature adjusting means for setting said thermostat and having off and temperature settings, temperature indicating means to indicate said settings, a timer having time, start, and stop indicators, time setting means for setting said start and stop indicators out of coincidence with said time indicator, means for locking said start and stop indicators to said time indicator as said time indicator moves into coincidence respectively with said start and stop indicators, a timer switch and a thermostat switch jointly controlling the energization of said heating means, said timer switch opening when said start indicator is out of coincidence with said time indicator or when said stop indicator is in coincidence with said time indicator, said thermostat switch being open when said temperature adjusting means is in the off setting or when said temperature adjusting means is at a temperature setting and the space to be heated has reached the temperature of the setting, and solenoid means for taking said timer out of control of said timer switch energizable by moving said temperature adjusting means to its off setting and then to a temperature setting after said time indicator has moved into coincidence with said stop indicator.

14. In combination, heating means, a timer having on and off setting knobs to establish a predetermined future control period of time for said heating means, a thermostat having an adjusting handle to set said thermostat at off and temperature positions, means controlled solely by said knobs and handle to place said timer and thermostat jointly or said thermostat alone in control of said heating means, a combined timer and thermostat indicating light, means controlled solely by said knobs and handle to control said light to indicate when said timer and thermostat have been placed jointly in control of said heating means, a thermostat and non-timer indicating light, and means controlled solely by said knobs and handle to control said last named light to indicate when said thermostat has been placed in control of said heating means independently of said timer.

15. In combination, heating means, a timer having on and off setting knobs to establish a predetermined future control period of time for said heating means, a thermostat having an adjusting handle to set said thermostat at off and temperature positions, means controlled solely by said knobs and handle to place said timer and thermostat jointly or said thermostat alone in control of said heating means, a combined timer and thermostat indicating light, means controlled solely by said knobs and handle to control said light to indicate when said timer and thermostat have been placed jointly in control of said heating means, a thermostat and non-timer indicating light, means controlled solely by said knobs and handle to control said last named light to indicate when said thermostat has been placed in control of said heating means independently of said timer, and a cycling light indicating when said heating means is cycled both under control of said timer and thermostat and under the control of said thermostat alone.

ROBERT R. CANDOR.

REFERENCES CITED

The following references are of record in the file of this patent:

UNITED STATES PATENTS

| Number | Name | Date |
|--------|------|------|
| 916,261 | Brissenden | Mar. 23, 1909 |
| 1,723,390 | Tingley | Aug. 6, 1929 |
| 1,745,420 | Hewitt | Feb. 4, 1930 |
| 1,926,532 | Grayson | Sept. 12, 1933 |
| 2,310,527 | Hutt | Feb. 9, 1943 |
| 2,327,632 | Frazier | Aug. 24, 1943 |
| 2,339,904 | Almquist | Jan. 25, 1944 |
| 2,350,078 | Smith, Jr. | May 30, 1944 |
| 2,392,166 | Lockwood | Jan. 1, 1946 |
| 2,403,824 | Newell | July 9, 1946 |
| 2,416,084 | Candor | Feb. 18, 1947 |
| 2,433,124 | Johnson | Dec. 23, 1947 |